Aug. 18, 1936.    L. P. F. VAN DER GRINTEN    2,051,582
METHOD FOR PRODUCING COPIES BY REFLECTOGRAPHY
Filed Aug. 3, 1934
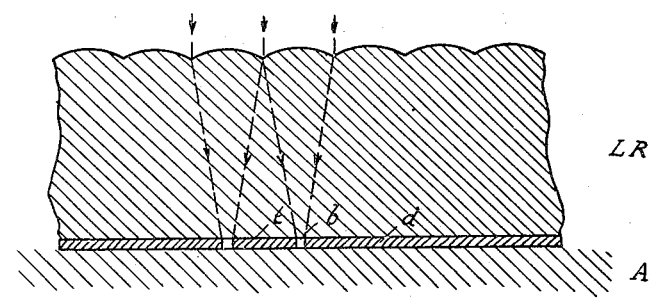
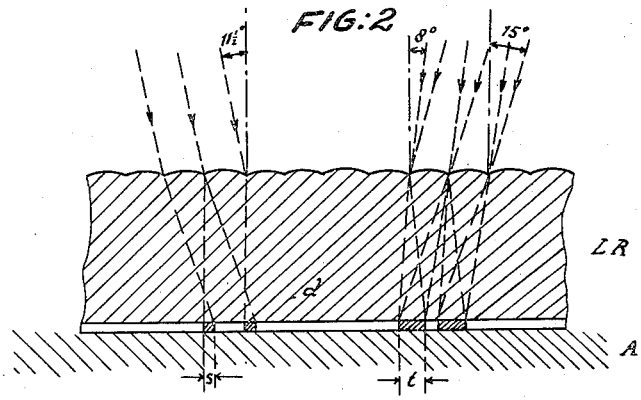
Inventor:
Lodewijk P. F. van der Grinten
By
Attorney Patented Aug. 18, 1936

2,051,582

UNITED STATES PATENT OFFICE 2,051,582

METHOD FOR PRODUCING COPIES BY REFLECTOGRAPHY

Lodewijk Pieter Frans van der Grinten, Venlo, Netherlands, assignor to Naamlooze Vennootschap Chemische Fabriek L. van der Grinten, Venlo, Netherlands, a limited liability company of Netherlands Application August 3, 1934, Serial No. 738,359
In the Netherlands August 11, 1933

7 Claims. (Cl. 95—5)

In the production of reflexion copies a process is known according to which the radiation, before its passage through the light-sensitive layer in which the image has to be formed, is subdivided into small regions of greater and of smaller actinic intensity.

This subdivision may be effected for example by causing the irradiation to take place through a so-called screen which may be provided between the source of radiation and the sensitive sheet, advantageously in the immediate neighbourhood of the sensitive sheet, possibly in direct contact therewith. Practically useful screens are not only covering screens, but also lens, prism, or similar screens. The lens, prism, or similar screens are hereinafter called dividing screens.

By the expression "dividing screen" must therefore be understood any structure that is pervious to radiation and that intercepts the radiation energy less than a covering screen when it divides a homogeneous radiation into small regions of greater and smaller activity.

As materials for making these dividing screens there come into question all materials that are pervious to radiation, as quartz, different sorts of glass, celluloid, cellulose, cellulose derivatives, gelatine and the like. The choice of the material is determined, inter alia by the desired index of refraction, by the manner of making, and of employment etc. Materials like celluloid, cellulose, cellulose derivatives, gelatine, and the like, have for example the advantage that they are unbreakable and can be made into thin foils.

The method with dividing screens has the advantage that, in comparison with covering screens, less of the radiated energy is intercepted. In the case of dividing screens a considerable portion of the impinging radiation energy is indeed let through and although there is subdivision into small regions of greater and smaller actinic activity the total quantity of the energy let through does not differ considerably from the total impinging energy. Dividing screens are consequently preferred in many cases to covering screens.

The present invention relates to the employment of dividing screens in reflectography. According to the invention it has been found that in the case of the method with dividing screens reflexion copies are obtained that are the stronger the greater is the ratio between the average intensity of the regions of greater actinic intensity and the average intensity of the regions of smaller actinic intensity.

It is not obvious that this ratio must be relatively great. For, the assumption would have been logical that a reflexion copy established with application of a subdivision of the irradiation always must be stronger than a reflexion copy obtained without subdivision, however small the abovementioned ratio in the subdivision might be. This, however, is not the case.

When the abovementioned ratio is insufficient, generally even worse results are obtained by the process with subdivision than by that without subdivision.

Only when the ratio in the subdivision is sufficiently great better results are obtained by the process with subdivision than by that without subdivision.

It is also advantageous in general in working with dividing screens to have the regions of greater activity or greater intensity as small as possible.

It has been found that a ratio between the pertinent activities of the regions of greater and smaller activity that is as large as possible can be attained by a combination of a lens or prism screen with a covering screen, the rays being concentrated for example by the lenses on the pervious parts of the covering screen. The impervious portions intercept the dispersed radiation in the regions of the smaller activity that is caused for example by imperfections of the lenses.

In the case of the employment of combinations of dividing and covering screenings the employment of radiation that is directed as parallelly as possible is desired.

The expression "parallelly directed radiation" is in reference hereto in this description and in the claims to be understood in a definite wide sense, and indeed, in such a manner that for example a radiation by a punctiform or approximately punctiform source of light at a distance not considerably greater than the dimensions of the system to be irradiated likewise comes under the expression "parallelly directed radiation". The rays have then, it is true, at different parts (at a great distance from one another) of the entry surface of the system to be irradiated directions that differ inter se, but at these parts themselves and in their immediate neighbourhood in the entry surface there are practically only rays of a definite direction. In practice it is in fact without further means extremely difficult and in many cases even practically impossible to produce a perfectly parallelly directed radiation (which consequently exhibits a like direction at all points throughout) of sufficient intensity over somewhat large surfaces. Therefore a radiation which proceeds for example from a punctiform or approximately punctiform source of radiation as for example an arc lamp at not too small a distance is to be regarded for the object of the invention (at least in comparison with a diffuse radiation) in practice as a parallelly directed radiation.

Instead of a punctiform source of radiation there may be advantageously used a linear or band-like source of radiation or a punctiform source of radiation moving rectilinearly, if there is employed for the production of the reflexion copy a subdivision of the radiation into small regions of greater and less actinic intensity that is linear. In such a case it is advantageous in the employment of the method according to the invention to arrange the linear or band-like source of radiation parallelly or approximately parallelly to the lines of the division. In the case of the employment of a linear or band-like source of radiation as above mentioned this radiation must be regarded as parallelly directed in the sense of what has been hereinbefore stated—at least in the case of a breadth of the band-like source of light that is relatively not too great. The rays have then it is true different directions inter se in their projection on a plane located perpendicularly to the divided and linear regions at different lines located at a great distance from one another of the entry surface of the system to be irradiated, but at these lines themselves and in their immediate neighbourhood in the entry surface there are practically only rays that have a definite direction in the above mentioned projection. A particularly good arrangement for what has been described above, especially for the irradiation of large surfaces, is obtained by giving the surface to be irradiated the form of a circular cylinder, which may move or not whilst the source of radiation is located or moves in the axis of the cylinder.

The abovementioned lens or prism covering screens may be advantageously obtained photochemically from sensitive material which is furnished with a lens or prism screen.

If one starts for example with a positive diazotype layer combined with a cylindrical lens screen and irradiates this system through the lenses on a background that is non-reflective or is reflective as little as possible, the diazo compound is decomposed in the focal lines. These consequently remain pervious to radiation, whilst the parts outside the focal lines become impervious during later formation of colouring matter. The irradiation is in this case advantageously carried out slowly, or care is taken that the diazo layer contains sufficient moisture and maybe through cooling remains at so low a temperature that the formation of injurious little bubbles during the irradiation is reduced as much as possible or prevented. If instead of the diazo layer there is employed a silver compound layer, a like effect may be produced by reversing the picture after the irradiation.

Also, without reversing the picture by means of negatively acting sensitive layers, as of silver compounds, dividing covering screens can be produced by carrying out the irradiation at a definite angle of incidence or several definite angles of incidence which are different from the angle of incidence that is to be employed during the use of the system obtained in this way as a dividing covering screen.

In this way the portions of the silver-compound layer that are situated outside the foci or focal lines to be employed later are rendered covering and consequently intercepting. Instead of diazo and silver compounds there may of course be employed any other photographic method that comes into question therefor. Thus, for example, dividing screens with reflective portions may be obtained by first producing a bichromate gelatine screen and then silvering or nickeling it. (See French patent specification 619,719.) Such screens have, in addition to the advantages of dividing screens, also the advantage of being reflective. Of course one may, without a photochemical method, simply put together a lens or prism screen and a covering screen, but in that case it is practically impossible to prevent moiré effects. It is not necessary to place the covering portions in the plane of the foci or focal lines. They may also be placed between the lenses before this plane, and, even, at not too great a distance, behind this plane. It is, however, advantageous to keep as small as possible the distance between the plane in which are located the covering portions and that in which are located the foci or focal lines.

During the production of reflection copies by means of a lens covering screen obtained photochemically it is important that during the making of the lens covering screen itself and during the production of the reflexion copies therewith each part of the entry surface of the lens covering screen is impinged upon by a radiation of the same or approximately the same direction in both cases, in both cases in the definite wide sense as stated above in the explanation of the expression "parallelly directed radiation", but with this exception that if the covering screen is obtained by a photochemical process on a negative acting layer without reversion of the negative, there must exist a definite difference between the direction of the rays in making the covering screen and the direction of the rays in using the screen. This difference, however, must be as much as possible the same in every place of the sheet.

This analogy of the two radiations may for example be realized by choosing the system comprising the source of radiation and the surface to be irradiated during the making of the lens covering screen as analogously as possible to the system that is desired to employ during the subsequent production of the reflexion copies. If, afterwards, it is desired to produce the reflexion copy with a definite angle of incidence, for example, greater than 0°, the lens covering screen required therefor must be made also with the same angle of incidence or when using a negative acting layer without reversion with an angle of incidence differing in a definite manner from the angle of incidence employed in the use of the screen.

In the same sense as that above mentioned for lens screenings, prism screenings are to be used combined with covering screenings. Also in this case the covering portions may be suitably reflective.

Figure 1 of the drawing shows a screen comprising a lenticular support and a sensitive layer of the diazo type having passages made therethrough by irradiation by light normal to the layer.

Figure 2 of the drawing shows a screen comprising a lenticular support and a light sensitive layer irradiated through the lenticulations by light at an angle to the normal.

Example I

A celluloid film provided with cylindrical lenses of a thickness of 0.4 mm. is covered on the side opposite the lenses with a sensitive layer which contains paradiazodimethylmetatoluidine chloride with resorcinol.

Instead of this there may for example be employed a celluloid foil L R of a thickness of 0.4 mm. provided with cylindrical lenses having a radius of 0.15 mm. and a distance of the focal lines between each other of 0.14 mm., which is provided on the non-lens side with a cellulose layer $d$ which has a thickness of 0.02 mm. and which contains the diazo compound and the azo component (see Fig. 1). These foils are, with their lenses turned towards the source of radiation, irradiated with the help of a tubular mercury-vapour lamp, which is arranged parallelly to the lines of the screen in the middle in front of the system at a distance of 40 cm. or is located in the axis of a circular cylinder on which is located the system to be irradiated. Advantageously there is employed a weak source of radiation or it is weakened artificially so that no or few small bubbles of nitrogen are formed. Instead of the above mentioned cellulose layer there may be used an acetyl cellulose layer which has been made wholly or partially hydrophilic by treatment with alkali, the sensitive layer being applied in the hydrophilic portion. For the celluloid foil there may be substituted an acetyl cellulose foil, and then the non-screened surface may be directly made hydrophilic and prepared. In this case there is no inconvenience arising from small bubbles of nitrogen even when the illumination is strong. Behind the sensitive layer there is an absorbing background A for example of black velvet. Irradiation is continued until on the microscopic examination of a sample it appears that the focal lines $b$ remain free from colouring matter on development with ammonia vapour, whilst colouring matter is formed in the intermediate portions $t$. Development with alkali is then carried out. In this way lens covering screens have been obtained that can serve for the making of reflexion copies. In this case the lenses are to be turned towards the source of radiation and irradiation is advantageously effected with an arrangement which is like or analogous to that mentioned above for the making of the lens covering screens. This arrangement need not be exactly the same; for example there may be substituted for the tubular source of radiation an arc lamp which can be moved in the line in which the tubular source of radiation would have been located. As sensitive layers there are used for example a highly contrasting silver bromide gelatine layer with a structure varying from grainless to fine-grained, a diazo layer or a negatively working blue-print layer, which are located on a celluloid carrier, for example of a thickness of about 0.1 mm., and which are advantageously arranged in such a manner that the sensitive layers are turned towards the side of the screen and thus away from the original. The reflexion copies thus obtained are stronger than those that are obtained with the lens screens alone in a like arrangement, because the ratio between the actinic intensity in the pervious portions to that in the impervious portions is greater. At the same time the irradiation time is shorter than that which would be necessary for the production of the same reflexion copies by means only of equivalent covering screens in the same arrangement.

Example II

A lens screen L R of a size of 20 x 30 cm. (see Fig. 2) consisting of an acetyl cellulose foil 0.16 mm. thick which is provided on one side with cylindrical lenses having a radius of 0.04 mm. and a mutual distance of the focal lines of 0.04 mm., is provided on the lens-free side with a sensitive chromate gelatine layer $d$. Behind the sensitive layer there is an absorbent background A. Irradiation is effected from the lens side by means of an arc lamp without reflector at a distance of about 1 m. at an angle of incidence of 11½° (this angle of incidence is measured in the middle of the irradiated system and in a plane perpendicular to the axes of the lenses). The angle of incidence is chosen on the left or the right in the plane through the source of radiation perpendicular to the axes of the cylindrical lenses.

After the irradiation the chromate gelatine picture is silvered or nickeled to make it highly reflective. There is obtained a reflective covering in the parts $s$. The lens covering mirror screen obtained forms a specially advantageous combination for the production of reflexion copies. In this production there are advantageously employed sensitive layers of for example a thickness of 0.01 mm. or less and irradiation is effected advantageously by means of a like or analogous system but now with an angle of incidence of 0°. The pencils of rays then pass through between the parts $s$. The result may be still somewhat improved by effecting the irradiation during the making of the lens covering mirror screen not with an angle of incidence of exactly 11½° but variously with angles of incidence varying between 3° and 15°, whereby a larger covering region $t$ is produced.

Also, in the making of the lens covering mirror screen angles of incidence of about 34½°, about 57°, and so on, or varying angles of incidence, which, as above indicated, are in the neighbourhood of these values, may be employed. Also several sources of radiation may be employed, it being assumed that their rays impinge at the above mentioned angles of incidence.

If in the abovementioned the lens-free side of the lens screen is provided with a silver bromide layer (a similar combination is used for colour kinematography), there is obtained a non-reflective lens covering screen which likewise gives a clearly better effect in the production of reflexion copies than the lens screen alone in the same arrangement.

In the making of this lens covering screen there is used a relatively weak source of radiation at a suitable distance. The angle of incidence is in this case for example again chosen at 11½° on the right or the left. After the usual treatments, as developing, fixing and washing, the lens covering screen is suitable for the making of reflexion copies at an angle of incidence of 0°. It is also suitable for the making of reflexion copies at angles of incidence of 23°, 46° and so on on the right or on the left.

When in the making of the lens covering screen there is used an angle of incidence of 5¾° on the left, the reflexion copy may be made at an equally great angle of incidence on the right. In the above all the angles of incidence are of course measured in a plane perpendicular to the axes of the screen and also in the middle of the lens covering screen to be made, or of the system to be copied, at least at the same place of the lens covering screen, as well during its making as during its use.

Example III

A foil of a cellulose derivative, 10 x 15 cm. with a thickness of 0.14 mm., which is provided on one side with cylindrical lenses having a radius of 0.04 mm. and a distance of the focal lines between each other of 0.04 mm., is provided on the other side with a grainless silver bromide gelatine emulsion layer of a thickness of 0.02 mm.

This foil is turned with the lens side towards the source of radiation and is irradiated by means of an arc lamp placed in the middle in front of the system at a distance of 50 cm., so that the angle of incidence of the radiation is 0°.

The arc lamp has a clear globe, no reflector, and a black or dark background. The axes of the cylindrical lenses are arranged parallelly to the arc.

Behind the sensitive layer there is an absorbing background, for example black velvet.

The irradiation is continued until all the silver bromide is activated at the places of the focal lines. Thereupon the screen picture is developed and then reversed as follows:—

Development 5 minutes in metol hydroquinone developer of the following composition:

| | |
|---|---|
| Hydroquinone | 6 gm. |
| Metol | 0.6 gm. |
| Crystalline sodium sulphite | 46 gm. |
| Potash | 45 gm. |
| Bromide of potash | 6 gm. |
| Potassium ferrocyanide | 9 gm. |
| Distilled water | 600 cc. |

After developing, washing in distilled water takes place for two minutes and then treatment in a reversing bath consisting of

| | |
|---|---|
| Potassium permanganate | 2 gm. |
| Concentrated sulphuric acid | 10 cc. |
| Distilled water | 1000 cc. | until all the black silver has disappeared. Then washing takes place in distilled water for 5 minutes.

Thereupon treatment is effected with a solution of 50 g. of sodium bisulphite in 500 cc. of distilled water until complete colourlessness is obtained.

Washing with distilled water then takes place for 5 minutes.

Then two minutes in soda lye of 0.75 per cent.

Then an irradiation is effected as above but with the gelatine side turned towards the source of light.

Developing then takes place for one minute in the above mentioned developer. Thorough washing concludes the operation. There has thus been obtained a lens covering screen which can be used in the manner stated in Example I for the production of reflexion copies at an angle of incidence of 0°.

What I claim is:—

1. A method for making reflexion copies comprising placing upon an original a sensitive sheet having a layer of sensitive material thereon, superimposing on said sensitive sheet an impervious apertured screen associated with a member of light refracting material for receiving radiation from a source and projecting the same on to the screen, said member comprising a multiplicity of optical devices so disposed that the most active beams produced thereby coincide with the screen apertures, causing a radiation to pass first through said member and then through the apertures of said screen to subdivide said radiation into a plurality of small separated distinct beams of irradiations, causing said separated beams to pass through said sheet on to the original, and causing the rays emitted from said beams striking the lighter parts of the original to be reflected upon the layer of sensitive material of said sheet.

2. A method for making reflexion copies comprising placing upon an original a sensitive sheet having a layer of sensitive material thereon, superimposing on said sensitive sheet an impervious apertured screen associated with a member of light refracting material for receiving radiation from a source and projecting the same on to the screen, said member comprising a multiplicity of lenses so disposed that the foci thereof coincide with the screen apertures, causing a radiation to pass first through said member and then through the apertures of said screen to subdivide said radiation into a plurality of small separated distinct beams of irradiations, causing said separated beams to pass through said sheet on to the original, and causing the rays emitted from said beams striking the lighter parts of the original to be reflected upon the layer of sensitive material of said sheet.

3. A method for making reflexion copies comprising placing upon an original a sensitive sheet having a layer of sensitive material thereon, superimposing on said sensitive sheet an impervious apertured screen associated with a member of light refracting material for receiving radiation from a source and projecting the same on to the screen, said member comprising a multiplicity of prisms so disposed that the most active beams produced thereby coincide with the screen apertures, causing a radiation to pass first through said member and then through the apertures of said screen to subdivide said radiation into a plurality of small separated distinct beams of irradiations, causing said separated beams to pass through said sheet on to the original, and causing the rays emitted from said beams striking the lighter parts of the original to be reflected upon the layer of sensitive material of said sheet.

4. A method for making reflexion copies comprising placing upon an original a sensitive sheet having a layer of sensitive material thereon, superimposing on said sensitive sheet an impervious apertured screen associated with a member of light refracting material for receiving radiation from a source and projecting the same on to the screen, said member comprising a multiplicity of optical devices so disposed that the most active beams produced thereby coincide with the screen apertures, causing a radiation to pass first through said member and then through the apertures of said screen to subdivide said radiation into a plurality of small separated distinct beams of irradiations, causing said separated beams to pass through said sheet on to the original, and causing the rays emitted from said beams striking the lighter parts of the original to be reflected upon the layer of sensitive material of said sheet, said radiation being emitted from a point like source of radiation.

5. A method for making reflexion copies comprising placing upon an original a sensitive sheet having a layer of sensitive material thereon, superimposing on said sensitive sheet an impervious screen having band-like apertures associated with a member of light refracting material for receiving radiation from a source and projecting the same on to the screen, said member comprising a multiplicity of optical devices so disposed that the lines of the most active beams produced thereby coincide with the screen apertures, causing a radiation to pass first through said member and then through the apertures of said screen to subdivide said radiation into a plurality of small separated distinct band-like beams of irradiations, causing said separated beams to pass through said sheet on to the original, and causing the rays emitted from said beams striking the lighter parts of the original to be reflected upon the layer of sensitive material of said sheet, said radiation being emitted from a point like source of radiation moving in a straight line substantially parallel to the bands of the screen and to the optical devices of the member of light refracting material.

6. A method according to claim 1 in which the system to be irradiated is located in a circular cylinder in the axis of which the source of radiation is located.

7. A method for making reflexion copies comprising placing upon an original a sensitive sheet having a layer of sensitive material thereon, superimposing on said sensitive sheet an impervious screen having band-like apertures associated with a member of light refracting material for receiving radiation from a source and projecting the same on to the screen, said member comprising a multiplicity of optical devices so disposed that the lines of the most active beams produced thereby coincide with the screen apertures, causing a radiation to pass first through said member and then through the apertures of said screen to subdivide said radiation into a plurality of small separated distinct band-like beams of irradiations, causing said separated beams to pass through said sheet on to the original, and causing the rays emitted from said beams striking the lighter parts of the original to be reflected upon the layer of sensitive material of said sheet, said radiation being emitted from a band-like source of radiation substantially parallel to the bands of the screen and to the optical devices of the member of light refracting material.

LODEWIJK PIETER FRANS
VAN DER GRINTEN.